US012729338B2

(12) United States Patent
Kim et al.

(10) Patent No.: US 12,729,338 B2
(45) Date of Patent: Sep. 8, 2026

(54) ELECTROCHROMIC DEVICE AND MANUFACTURING METHOD THEREFOR

(71) Applicant: DONGJIN SEMICHEM CO., LTD, Incheon (KR)

(72) Inventors: Young Mi Kim, Seongnam-si (KR); Jong Bok Kim, Seongnam-si (KR); Jong Gyu Baek, Seongnam-si (KR); Joo Cheol Lee, Seongnam-si (KR); Kyu Soon Shin, Seongnam-si (KR)

(73) Assignee: DONGJIN SEMICHEM CO., LTD., Incheon (KR)

( * ) Notice: Subject to any disclaimer, the term of this patent is extended or adjusted under 35 U.S.C. 154(b) by 996 days.

(21) Appl. No.: 17/360,831

(22) Filed: Jun. 28, 2021

(65) Prior Publication Data

US 2021/0324261 A1 Oct. 21, 2021

Related U.S. Application Data

(63) Continuation of application No. PCT/KR2019/018805, filed on Dec. 31, 2019.

(30) Foreign Application Priority Data

Dec. 31, 2018 (KR) ........................ 10-2018-0173961

(51) Int. Cl.

| | |
|---|---|
| ***C09K 9/02*** | (2006.01) |
| ***G02F 1/1516*** | (2019.01) |
| ***G02F 1/1523*** | (2019.01) |

(52) U.S. Cl.

CPC .............. *C09K 9/02* (2013.01); *G02F 1/1516* (2019.01); *G02F 1/1523* (2013.01); *C09K 2211/1014* (2013.01); *C09K 2211/1018* (2013.01); *C09K 2211/1425* (2013.01); *C09K 2211/1433* (2013.01)

(58) Field of Classification Search

None

See application file for complete search history.

(56) References Cited

U.S. PATENT DOCUMENTS

| | | | | |
|---|---|---|---|---|
| 5,876,634 | A * | 3/1999 | Coleman | C09K 9/00 75/255 |
| 2011/0292487 | A1* | 12/2011 | Noh | G02F 1/15 359/265 |
| 2012/0113496 | A1* | 5/2012 | Ueda | G02F 1/153 359/266 |
| 2018/0364541 | A1 | 12/2018 | Turner et al. | |

FOREIGN PATENT DOCUMENTS

| | | | |
|---|---|---|---|
| JP | 2004-133234 | A | 4/2004 |
| JP | 2004-205628 | A | 7/2004 |
| KR | 10-2017-0104944 | A | 9/2017 |
| KR | 10-2018-0029768 | A | 3/2018 |
| KR | 10-2018-0119121 | A | 11/2018 |
| KR | 10-2018-0125324 | A | 11/2018 |

OTHER PUBLICATIONS

Request for the Submission of an Opinion issued in Korean counterpart application No. KR 10-2019-0179574 dated Jun. 10, 2024.

* cited by examiner

*Primary Examiner* — Sheeba Ahmed

(74) *Attorney, Agent, or Firm* — United One Law Group LLC; Kongsik Kim; Jhongwoo Peck

(57) ABSTRACT

Disclosed are an electrochromic device and a manufacturing method therefor. The disclosed electrochromic device may comprise: a first electrochromic layer made of a first electrochromic agent; and a second electrochromic layer located on at least one surface of the first electrochromic layer and made of at least one of a second electrochromic derivative and a second electrochromic agent.

7 Claims, 5 Drawing Sheets

ELECTROCHROMIC DEVICE AND MANUFACTURING METHOD THEREFOR

CROSS-REFERENCE TO RELATED APPLICATIONS

The present application is a continuation application of International Application No. PCT/KR2019/018805 filed on Dec. 31, 2019, which claims priority to Korean Application No. 10-2018-0173961 filed on Dec. 31, 2018. The applications are incorporated herein by reference.

TECHNICAL FIELD

The present invention relates to an electrochromic device and a manufacturing method therefor and, more particularly to an electrochromic device having an improved transmittance control function, which increases transmittance when uncolored and decreases transmittance when discolored, and a manufacturing method therefor.

BACKGROUND ART

A general electrochromic device includes a transparent conductive substrate, an ion storage thin film or an electrochromic thin film (positive electrode), an ion conductor (electrolyte), an electrochromic thin film (negative electrode), and a transparent conductive substrate. Here, when the electrochromic thin film absorbs ions or is deprived of ions from an electrolyte, a light absorption layer (color change) may change. The ions constituting the ion conductive layer can move by a voltage applied between the two transparent conductors. Here, the voltage required is at the level of 1 to 3V, and can have characteristics that are easy to receive power from a battery and a solar cell.

Recently, the development and research of technology capable of implementing various colors using the electrochromic device are underway. For example, electrochromic devices are being applied in various fields such as liquid crystal display devices and incident light amount controlling devices for buildings and other facilities such as smart windows. In particular, the electrochromic device used in the smart window enables efficient energy use by freely controlling the intensity of sunlight incident into the building as necessary. Accordingly, the electrochromic device has an effect of reducing energy costs related to heating and cooling, and thus the importance thereof has been highlighted.

Meanwhile, electrochromic devices using an electrochromic phenomenon can generally be classified into three types: first, an electrochromic agent dissolves in a solution and becomes discolored; second, an electrochromic agent exists in a liquid state, and the electrochromic agent accompanies discoloration through oxidation and reduction on the surface of a catalyst electrode such as a metal; and third, an electrochromic agent and all constituent materials are in a solid phase. Here, while the second and third types of electrochromic devices have a memory effect in which color is maintained even if the power is turned off after discoloration, the first type of electrochromic device requires a continuous current supply to maintain the color. Therefore, research into to technology that combines only the advantages or merits of various types of electrochromic devices is continuously being conducted.

Meanwhile, in the prior art, a technology is disclosed for improving a contrast ratio during transmission and blocking within the capability range of an electrochromic layer by introducing the electrochromic layer between electrodes.

However, in the prior art, the electrochromic layer is formed to have a multi-layered structure, and thus there is no disclosure of a technology in which transmittance can be adjusted and response speed is improved.

SUMMARY

The present invention has been devised in view of the above problems, and an object of the present invention is to provide an electrochromic device having improved transmittance when uncolored and an increased blocking rate when discolored by including a multi-layered electrochromic layer, compared to a case of including a single electrochromic layer, and a manufacturing method therefor.

To achieve the above object, an electrochromic device according to the present invention may comprise: a first electrochromic layer made of a first electrochromic agent; and a second electrochromic layer located on at least one surface of the first electrochromic layer and made of at least one of a second electrochromic derivative and a second electrochromic agent.

In addition, an electrochromic device according to the present invention may comprise: a first electrochromic layer made of a first electrochromic derivative or a combination of a first electrochromic derivative and a first electrochromic agent; and a second electrochromic layer located on at least one surface of the first electrochromic layer and made of at least one of a second electrochromic derivative or a combination of a second electrochromic derivative and a second electrochromic agent, wherein the diameter of the first electrochromic derivative and the diameter of the second electrochromic derivative satisfy the conditional expression 1 below:

$$S_1<S_2 \quad \text{<Conditional Expression 1>}$$

where $S_1$ is the diameter of the first electrochromic derivative 210, and $S_2$ is the diameter of the second electrochromic derivative 220.

In addition, the diameter $S_1$ of the first electrochromic derivative 210 may satisfy the conditional expression 2 below:

$$1<S_1<500\ [\text{nm}] \quad \text{<Conditional Expression 2>}$$

where $S_1$ is the diameter of the first electrochromic derivative 210.

Each of the first and second electrochromic agents may include at least one of an organic material and an organic-inorganic composite.

Here, the organic material may include at least one selected from the group consisting of pyrrole, furan, thiophene, phenazine, selenophene, aniline, EDOT, EDOS, ProDOT, polyaniline, polypyrrole, polythiophene, carbazole, poly(p-phenylene vinylene, polyphenylene vinylene (PPV), poly(o-aminophenol, acetylene, phenylenediamine, phenothiazine and tetrathiafulvalene (TTF), viologen, wurster blue, perylene diimide, and triethylamine.

In addition, the organic-inorganic composite may include at least one selected from the group consisting of porphyrin, prussian blue, phthalocyanine, and bismuth.

In addition, each of the first and second electrochromic derivatives may contain an inorganic material.

Here, the inorganic material may include at least one material selected from the group consisting of titanium (Ti), chromium (Cr), iron (Fe), cobalt (Co), tantalum (Ta), indium (In), magnesium (Mg), copper (Cu), zinc (Zn), tin (Sn), iridium (Ir), molybdenum (Mo), nickel (Ni), tungsten (W), vanadium (V), cerium (Ce), cesium (Cs), platinum (Pt), manganese (Mn), niobium (Nb), rhodium (Rh), ruthenium (Ru), and antimony (Sb), or at least one of oxides thereof.

The first electrochromic layer may satisfy the conditional expression 3 below:

$$1 \leq L_t \leq 5000 \text{ [nm]} \quad \text{<Conditional Expression 3>}$$

where $L_t$ is the thickness of the first electrochromic layer.

The electrochromic device having the above-described configuration and the manufacturing method therefor, according to the present invention, can improve the transmittance through a control function of increasing the transmittance when uncolored and reducing the transmittance when discolored, by including a multi-layered electrochromic layer.

Further, the electrochromic device and manufacturing method therefor, according to the present invention, can increase the discoloration efficiency and increase the response speed, by forming the electrochromic layer into two layers.

In addition, the electrochromic device and manufacturing method therefor, according to the present invention, can lower a reduction in the initial substrate haze value and the light-shielding rate and increase the transmittance by including an electrochromic layer composed of an electrochromic agent and an electrochromic derivative.

BRIEF DESCRIPTION OF DRAWINGS

The present invention will be described in detail by the following drawings, but these drawings show embodiments of the present invention and thus the technical idea of the present invention is limited only to the drawings and should not be interpreted.

DETAILED DESCRIPTION

Hereinafter, an electrochromic device having improved transmittance and a manufacturing method therefor, according to an embodiment of the present invention, will be described in detail with reference to the accompanying drawings.

Figure 1:
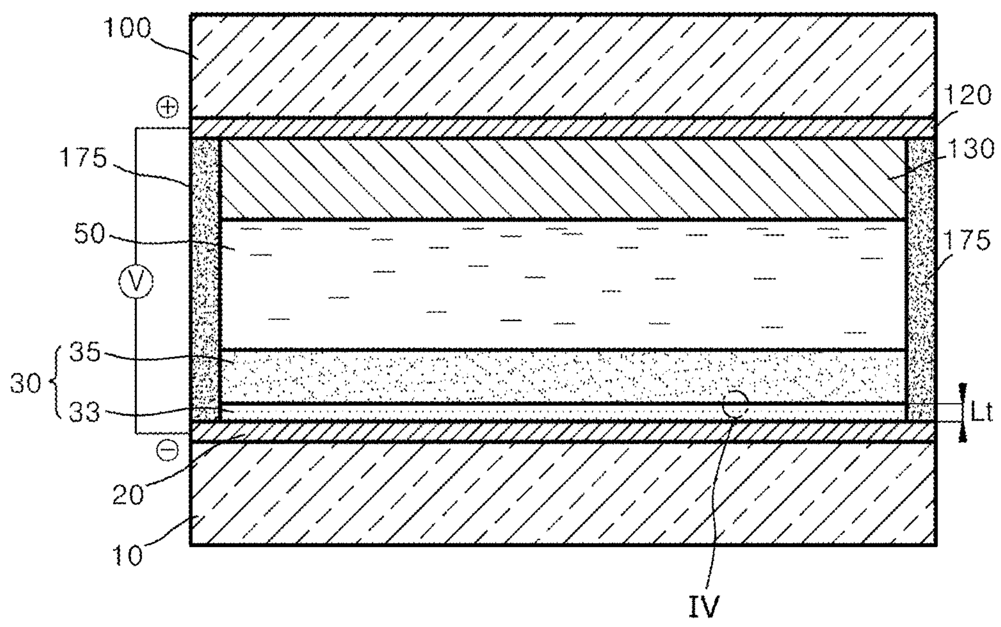
FIG. 1 is a schematic view of an electrochromic device according to an embodiment of the present invention.
Figure 2:
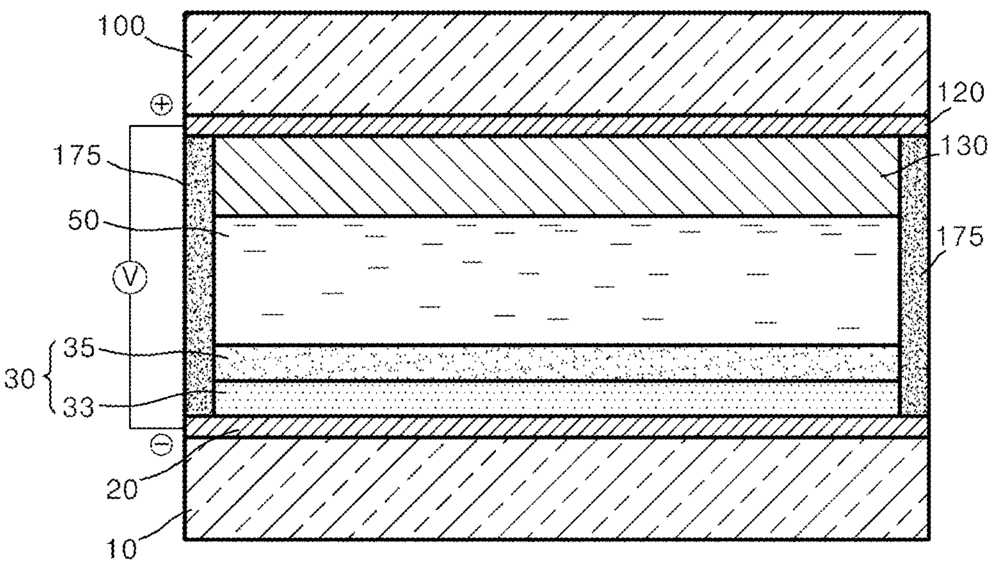
FIG. 2 is a schematic view of an electrochromic device according to another embodiment of the present invention.
Figure 3:
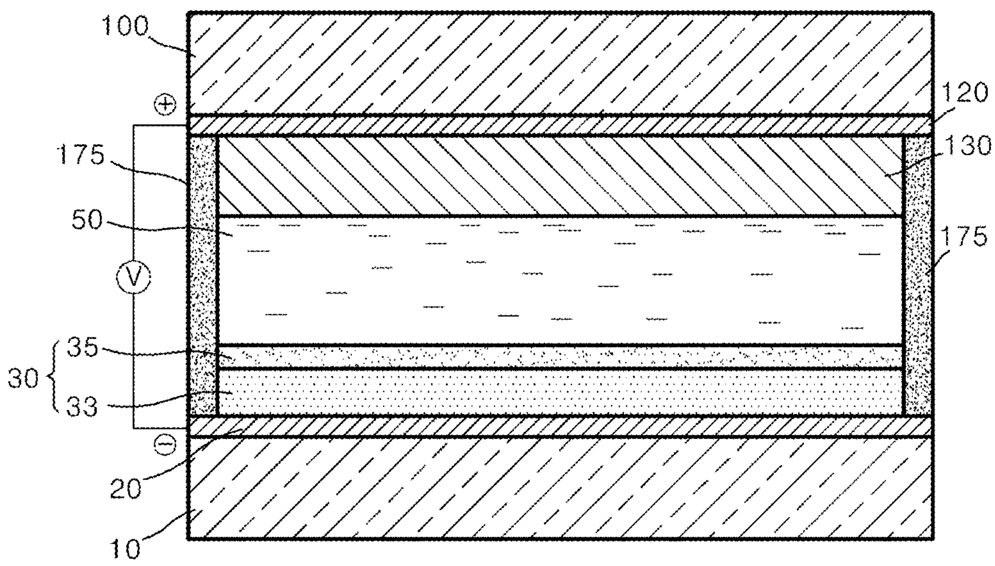
FIG. 3 is a schematic view of an electrochromic device according to still another embodiment of the present invention.
Figure 4:
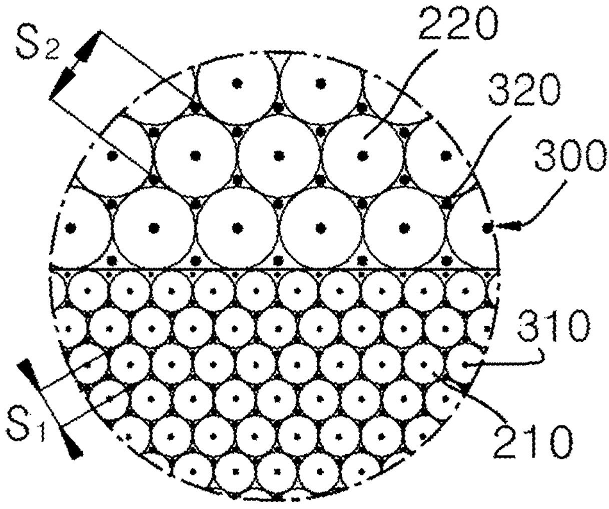
FIG. 4 is an enlarged view of a portion IV of FIG. 1.

FIGS. 1 to 3 are schematic views of electrochromic devices according to embodiments of the present invention, respectively, and FIG. 4 is an enlarged view of a portion IV of FIG. 1. FIGS. 1 to 3 differ from one another in that the thicknesses of the first electrochromic layer 33 and the second electrochromic layer 35 to be described later are set differently, and the remaining components are substantially the same. Thus, the same elements are denoted by the same reference numerals.

Referring to FIG. 4, an electrochromic agent 300 may include a first electrochromic agent 310 located on a first electrochromic layer 33 and a second electrochromic agent 320 located on a second electrochromic layer 35, and an electrochromic derivative 200 may include a first electrochromic derivative 210 located on the first electrochromic layer 33 and a second electrochromic derivative 220 located on the second electrochromic layer 35.

The electrochromic device according to an embodiment of the present invention may include the first electrochromic layer 33 made of the first electrochromic agent 310 and the second electrochromic layer 35 located on at least one side of the first electrochromic layer 33 and made of the second electrochromic derivative 220 or a combination of the second electrochromic derivative 220 and the second electrochromic agent 320.

An electrochromic device according to another embodiment of the present invention may include a first electrochromic layer 33 and a second electrochromic layer 35, the first electrochromic layer 33 may be made of the first electrochromic derivative 210 or a combination of the first electrochromic derivative 210 and the first electrochromic agent 310, and the electrochromic derivative 210 may include metal oxide nanoparticles having a nanometer (nm) size. The second electrochromic layer 35 is located on at least one surface of the first electrochromic layer 33, and it may be made of the second electrochromic derivative 220 or a combination of the second electrochromic derivative 220 and the second electrochromic agent 320. The second electrochromic layer 35 is made of a material having a relatively larger particle size than the first electrochromic layer 33. Therefore, the electrochromic layer of the electrochromic device according to the present invention is composed of multiple layers of the first electrochromic layer 33 and the second electrochromic layer 35, rather than a single layer, thereby providing the effect of improving the transmittance by controlling transmittance to be increased when the electronic device is uncolored and controlling the transmittance to be decreased when the electronic device is discolored.

Each of the first electrochromic agent 310 and the second electrochromic agent 320 according to the present invention may include at least one of an organic material and an organic-inorganic composite. Each of the first electrochromic agent 310 and the second electrochromic agent 320 alone may constitute an electrochromic layer, or each of the first electrochromic agent 310 and the second electrochromic agent 320 in combination with the first electrochromic derivative 210 or the second electrochromic derivative 220 may constitute the electrochromic layer. The electrochromic layer is capable of being discolored or decolorized according to oxidation or reduction.

The organic material may include at least one selected from the group consisting of pyrrole, furan, thiophene, phenazine, selenophene, aniline, EDOT, EDOS, ProDOT, polyaniline, polypyrrole, polythiophene, carbazole, poly(p-phenylene vinylene), polyphenylene vinylene (PPV), poly (o-aminophenol), acetylene, phenylenediamine, phenothiazine and tetrathiafulvalene (TTF), viologen, wurster blue, perylene diimide, and triethylamine. The organic material can implement various colors when used as an electrochromic material, and it has the advantages of excellent discoloration efficiency and response speed. Therefore, the electrochromic device to which the organic material is applied is highly applicable as a display device.

In particular, an asymmetric viologen derivative may be applied as a viologen among the organic materials. A carboxylic acid or phosphoric acid group may be introduced to one end of the 4,4'-bipyridine core so as to be adsorbed on the surface of the metal oxide of the electrode, and various functional groups for imparting colors and optical properties to the viologen may be introduced to the other end. Specifically, the viologen may be an asymmetric viologen derivative represented by Formula 1 below:

[Formula 1]

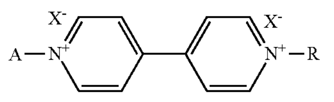

A may be selected as an adsorption functional group (carboxyl group or phosphoric acid group). R may be selected as a functional group imparting optical properties. The viologen derivative in which a methyl group is introduced into R exhibits a dark blue color, and the viologen derivative in which a cyanophenyl group is introduced into R may exhibit a green color upon primary reduction. In addition, the viologen derivative in which a benzoimidazol group is introduced into R may exhibit both dark blue and yellow colors.

The organic-inorganic composite may include at least one compound selected from the group including porphyrin, prussian blue, phthalocyanine, and bismuth.

The first electrochromic derivative 210 and the second electrochromic derivative 220, according to the present invention, may contain an inorganic material. The first electrochromic derivative 210 may include metal oxide nanoparticles having a nanometer (nm) size and may constitute an electrochromic layer alone, or in combination with the first electrochromic agent 310 or the second electrochromic agent 320. The electrochromic layer is capable of being discolored or decolorized according to oxidation or reduction.

The inorganic material may include at least one material of titanium (Ti), chromium (Cr), iron (Fe), cobalt (Co), tantalum (Ta), indium (In), magnesium (Mg), copper (Cu), zinc (Zn), tin (Sn), iridium (Ir), molybdenum (Mo), nickel (Ni), tungsten (W), vanadium (V), cerium (Ce), cesium (Cs), platinum (Pt), manganese (Mn), niobium (Nb), rhodium (Rh), ruthenium (Ru), antimony (Sb), and an oxide thereof. These inorganic materials are excellent in durability and can be used for a long time when used as electrochromic materials, and the electrochromic devices to which the inorganic materials are applied can be mainly applied to and used for functional glass windows of buildings.

The first electrochromic derivative 210 and the second electrochromic derivative 220, by including specifically tungsten trioxide ($WO_3$) or the like, may be discolored or decolorized as they are oxidized or reduced without an electrochromic agent. In addition, the first electrochromic derivative 210 and the second electrochromic derivative 220, by including specifically titanium dioxide ($TiO_2$), may be discolored or decolorized as they are oxidized or reduced in combination with an electrochromic agent.

Specifically, when the first electrochromic derivative 210 and the second electrochromic derivative 220 are used in combination with an electrochromic agent, $TiO_2$ nanoparticles can be used as the first electrochromic derivative 210 and the second electrochromic derivative 220. Since the $TiO_2$ nanoparticles have excellent electrical conductivity to be capable of moving electrons efficiently and have a very large surface area, they can adsorb a large amount of electrochromic materials well. In addition, since an electrochromic layer made of $TiO_2$ nanoparticles has excellent transmittance to visible light, and the pore structure of an electrode can be relatively easily adjusted, the durability of the device can be improved by controlling pores for smooth diffusion of an electrolyte in the case of using semi-solid and solid electrolytes.

In the electrochromic device according to the present invention, the first electrochromic layer 33 is more densely formed than the second electrochromic layer 35 to adjust the function thereof so as to increase the transmittance when the electrochromic device is uncolored and to reduce the transmittance when the electrochromic device is discolored, thereby improving the transmittance. Specifically, when the first electrochromic layer 33 is made of a first electrochromic agent 310 including at least one of an organic material or an organic-inorganic composite, the second electrochromic layer 35 may be the second electrochromic derivative 220, the second electrochromic agent 320, or a combination of the second electrochromic derivative 220 and the second electrochromic agent 320. In addition, when the first electrochromic layer 33 essentially includes the first electrochromic derivative 210, the second electrochromic layer 35 may be configured to include the second electrochromic derivative 220 having a size larger than that of the first electrochromic derivative 210.

Referring to FIG. 4, when both of the first electrochromic layer 33 and the second electrochromic layer 35 include an electrochromic derivative, the first electrochromic derivative 210 and the second electrochromic derivative 220 may satisfy the conditions of the conditional expression 1 below:

$$S_1 < S_2 \quad \text{[Conditional Expression 1]}$$

where $S_1$ is the diameter of the first electrochromic derivative 210, and $S_2$ is the diameter of the second electrochromic derivative 220.

If the particle diameter of the first electrochromic derivative 210 is greater than or equal to the diameter of the second electrochromic derivative 220, the amount of the electrochromic material adsorbed may decrease, and thus the discoloration efficiency may be lowered. Therefore, when the conditional expression 1 is satisfied, the response speed may be increased, and the discoloration efficiency may be increased.

Meanwhile, the diameter ($S_1$) of the first electrochromic derivative 210 may satisfy the condition of the conditional expression 2 below:

$$1 < S_1 < 500 \text{ [nm]} \quad \text{[Conditional Expression 2]}$$

where $S_1$ is the diameter of the first electrochromic derivative 210.

If the particle diameter of the first electrochromic derivative 210 is smaller than 1 nm, interfacial resistance between particles may increase, and thus the response speed may be lowered. In addition, if the particle diameter is greater than 500 nm, the amount of the electrochromic material adsorbed may decrease, and thus the discoloration efficiency may be lowered. Here, the response time (RT) may be defined as the time to be taken for the difference in reflectivity in the initial state to change to about ⅔ of the maximum discoloration state under a specific wavelength condition. Therefore, If the conditional expression 1 is satisfied, the response speed may be increased, and the color change efficiency may be increased. If the size of the particle diameter of the first electrochromic derivative 210 decreases in the range of 1 nm to 500 nm, the amount of adsorption of the electrochromic material increases due to the increase in the surface area, thereby increasing the discoloration efficiency. However, If $S_1$ is out of the above condition range, the discoloration efficiency may be reduced.

In addition, the first electrochromic layer 33 may satisfy the condition of the conditional expression 3 below:

$$1 \le L_f \le 5000 \text{ [nm]} \quad \text{[Conditional Expression 3]}$$

where $L_t$ is the thickness of the first electrochromic layer.

If the first electrochromic layer 33 has a thickness within the condition range of the conditional expression 3, the initial transmittance may be improved. However, If the thickness of the first electrochromic layer 33 is out of the condition range of the conditional expression 3, the initial transmittance may not be good.

Table 1 below shows the specifications of the first electrochromic derivative 210, the second electrochromic derivative 220, the first electrochromic layer 33, and the second electrochromic layer 35 according to the embodiments shown in FIGS. 1 to 3.

TABLE 1

| Specification | FIG. 1 | FIG. 2 | FIG. 3 |
|---|---|---|---|
| Diameter ($S_1$) of first electrochromic derivative [nm] | 7 | 7 | 7 |
| Thickness of first electrochromic layer [nm] | 500 | 3000 | 5000 |
| Diameter ($S_2$) of second electrochromic derivative [nm] | 20 | 20 | 20 |
| Thickness of second electrochromic layer [nm] | 3000 | 3000 | 3000 |

In addition, the electrochromic device according to an embodiment of the present invention may include a first substrate 10 and a second substrate 100, a first conductive coating 20 and a second conductive coating 120 coated on the first substrate 10 and the second substrate 100, respectively, to facilitate the flow of electrons, a first electrode layer 30 and a second electrode layer 130 formed on the first conductive coating 20 and the second conductive coating 120, respectively, a sealing portion 175 connecting and sealing the first substrate 10 and the second substrate 100, and an electrolyte 50 that is injected into the sealed empty space and responsible for electron transfer in the device by ion diffusion.

The first substrate 10 may be made of a glass or plastic material. Examples of the plastic material may include polyethylene terephthalate (PET), polyethylene naphthalate (PEN), etc.

The first conductive coating 20 may increase transmittance of the first substrate 10 and decrease sheet resistance. The smaller the resistance value of the first conductive coating 20, the smoother the flow of electrons can be, and the response speed (color conversion speed) of the device can be determined according to the resistance. In addition, the first conductive coating 20 may be formed by coating a material such as fluorine-doped tin oxide (FTO) on the first substrate 10. Here, examples of the coating material may include, in addition to the FTO, indium tin oxide (ITO), antimony tin oxide (ATO), aluminum zinc oxide (AZO), and indium zinc oxide (IZO).

The multi-layered electrochromic layer including the first electrochromic layer 33 and the second electrochromic layer 35 may be included in the first electrode layer 30 or the second electrode layer 130, or it may be included in both. In addition, the multi-layered electrochromic layer may be an oxidizing color change layer or a reduction color change layer depending on the material constituting the electrochromic layer.

Meanwhile, the electrochromic layer of the present invention is formed in a multi-layered structure including the first electrochromic layer 33 and the second electrochromic layer 35, thereby solving the problem occurring to a conventional electrochromic layer having a single layer structure in which the response speed or transmittance may decrease according to the size and thickness of electrochromic particles. That is, when the interfacial resistance between particles of the first electrochromic layer 33 increases and the response speed decreases, the second electrochromic layer 35 compensates for such shortcomings, thereby increasing the response speed and improving the transmittance.

In order to exhibit such an optimal effect, the first electrochromic layer 33, the second electrochromic layer 35, the first electrochromic derivative 210, and the second electrochromic derivative 220 may satisfy the conditions of the conditional expressions 1 to 3.

Of the first electrode layer 30 and the second electrode layer 130, the electrode layer not including the multi-layered electrochromic layers 33 and 35 of the present invention may be formed by including at least one of Prussian blue, carbon, tungsten trioxide ($WO_3$), It may be formed by including at least one of antimony (Sb) doped tin oxide $SnO_2$ and triphenylamine (TPA) adsorbed on titanium dioxide ($TiO_2$). In particular, when triphenylamine is adsorbed on the second conductive coating 120 with titanium dioxide ($TiO_2$), metal ions of an electrode layer may not be deposited on an electrode layer opposite to the electrode layer when driving the device, leading to increased stability. In addition, in this case, high discoloration efficiency and fast response speed can be achieved.

The second conductive coating 120 is formed on the second substrate 100 to facilitate the flow of electrons. Since the materials of the second substrate 100 and the second conductive coating 120 are substantially the same as those of the first substrate 10 and the first conductive coating 20, a detailed description thereof will be omitted.

The sealing portion 175 may serve to seal the electrolyte 50 interposed between the first electrode layer 30 and the second electrode layer 130 so as not to leak out, and it may be made of a polymer spacer film or the like.

The electrolyte 50 is injected into the space between the first electrode layer 30 and the second electrode layer 130. In addition, the electrolyte 50 is responsible for electron transfer in the device by ion diffusion, and it is a material that can significantly affect the response speed of the device. In addition, the electrolyte 50 may be composed of a solvent and $Li^+$ ionic species, may be colorless, may have no chemical reactivity with the material constituting the device, and may use polymers and inorganic materials with high ionic conductivity. As the solvent, a nitrile-based solvent, such as acetonitrile (ACN), 3-methoxy propionitrile (MPN), gamma-butyrolatone, and ethylene carbonate, etc. may be used. Here, the γ-butyrolatone solvent can easily solve the problem with durability of the device due to the electrolyte, and electrolyte injection can be facilitated when manufacturing a large area device. In addition, the acetonitrile (ACN) solvent is a liquid electrolyte, which can be attributed to rapid electrolyte diffusion.

Meanwhile, in FIGS. 1 to 3, the multi-layered electrochromic layer of the present invention has been described as an example, but it is not limited thereto.

Depending on the type of electrochromic device, the second electrode layer 130 may be formed by printing in the following manner. In the case of a transmissive electrochromic device, the area of the second electrode layer 130 should be printed larger than that of the first electrode layer 30. However, in the case of a reflective electrochromic device, the second electrode layer 130 can be formed by printing a scattering layer thereon. The scattering layer may be composed of a paste mainly used for dye-sensitized solar cells. In addition, the scattering layer may be formed to a thickness of approximately 5 μm. A reflective electrochromic device can advantageously increase the contrast ratio compared to a transmissive electrochromic device.

Specifically, when the first substrate 10 and the second substrate 100 are prepared, fluorine-doped tin oxide may be coated on a glass substrate. Meanwhile, in order to form a large-area device, a metal grid may be formed on the transparent conductive substrate (FTO) by printing a mesh-type metal transparent film without causing a problem in the transmittance specification of the device.

In particular, in forming the first electrode layer 30 installed on the first substrate 10 (S15), an electrode of a predetermined thickness made of $TiO_2$ nanoparticles having a diameter of 5 to 30 nm may be printed on the transparent conductive first substrate 10 washed after being coated with FTO.

Meanwhile, visibility is very important in an electrochromic device, and thus an electrode having excellent transparency can be used. Therefore, a film stabilization step may be added to improve surface uniformity after the printing. In addition, since the discoloration efficiency of the device is proportional to the amount of electrochromic organic matter carried on the electrode, it is necessary to control the discoloration efficiency of the device through thickness control. Here, the organic material may include a material that is colored when obtaining electrons. In addition, the prepared first electrode layer 30 may be immersed in an electrochromic solution having a concentration of 0.3 to 0.5 mM for a certain period of time.

Subsequently, in assembling with the sealing portion 175 (S30), the first substrate 10 and the second substrate 100 may be connected to each other, and a sealing portion 175 may be installed to form a sealed empty space between the first electrochromic layer 33 or the second electrochromic layer 35 and the second electrode layer 130.

Lastly, in injecting the electrolyte 50 (S40), the electrolyte 175 responsible for electron transfer in the device may be injected into the empty space by ion diffusion. Here, as the electrolyte 170, a solid electrolyte may be used. After injecting the electrolyte 50 (S40), the electrochromic device may be manufactured by curing at 1 J/$cm^2$.

Hereinafter, the present invention will be described in more detail through the following examples, but the following examples are for illustrative purposes only and are not intended to limit the scope of the present invention. In addition, the following comparative examples do not imply a prior art and are provided only for comparison with the examples.

<1. Electrochromic Device Including First Electrochromic Layer (33) Formed of First Electrochromic Agent (310)>

[Electrochromic Device Formation Method]

Step 1: Manufacture of first electrode layer (oxidative discoloration layer)

(1) Formation of conductive coating

The conductive coating was formed by coating fluorine-doped tin oxide (FTO) on the substrate.

(2) Formation of first electrochromic layer (33)

In Examples 1 to 4, the electrochromic layer 33 was formed on the FTO by spin-coating polyaniline-based material (pernigraniline), and in Examples 5 to 8, poly(o-aminophenol) on the FTO, to a thickness in the range of 1 nm to 5000 nm.

In Comparative Example 1, the first electrochromic layer 33 was not formed.

In Comparative Examples 2 and 3, the electrochromic layer 33 was formed on the FTO by spin-coating polyaniline-based material (pernigraniline), and in Comparative Examples 4 and 5, poly(o-aminophenol) on the FTO, to thicknesses in the ranges of 0.1 nm and 5500 nm, respectively.

(3) Formation of second electrochromic layer (35)

Thereafter, a $TiO_2$ solution was bar-coated to a thickness of 20 nm and dried at 80° C. to form a second electrochromic layer 35.

Thereafter, triphenylamine (TPA) was adsorbed.

Step 2: Manufacture of second electrode layer (reducing discoloration layer)

A conductive coating was formed by coating fluorine-doped tin oxide (FTO) on the substrate.

Next, the $TiO_2$ solution was bar-coated on the FTO to a thickness of 20 nm and then dried at 80° C.

Thereafter, viologen was adsorbed to a thickness of 1 nm to 500 nm.

Step 3: Bonding and curing of the first electrode layer and the second electrode layer The first electrode layer and the second electrode layer were bonded together using a sealing agent.

Thereafter, an electrolyte was injected between the first electrode layer and the second electrode layer, followed by curing at 1 J/$cm^2$.

Table 2 below shows examples of the present invention and comparative examples. That is, when the first electrochromic layer 33 is made of only the first electrochromic agent 310 of an organic material having a predetermined thickness, differences in the haze reduction depending on the type of the organic material and the thickness of the first electrochromic layer 33, and the transmittance and light-shielding rate of each electrochromic device (ECD), are comparatively shown.

TABLE 2

| | First electrochromic layer | | Second electrochromic layer | | Substrate haze | | ECD | |
|---|---|---|---|---|---|---|---|---|
| Data | Electrochromic agent | Thickness (nm) | Electrochromic derivative | Thickness (nm) | Before coating | After coating | Transmittance | Light shielding rate |
| Ex.1 | pernigraniline | 1 | $TiO_2$ | 20 | 7 | 4.5 | 74 | 29 |
| Ex.2 | pernigraniline | 500 | $TiO_2$ | 20 | 7 | 3.8 | 75 | 23 |
| Ex.3 | pernigraniline | 1000 | $TiO_2$ | 20 | 7 | 3.1 | 76 | 20 |
| Ex.4 | pernigraniline | 5000 | $TiO_2$ | 20 | 7 | 3.1 | 76 | 21 |
| Ex.5 | Poly (o-amino phenol) | 1 | $TiO_2$ | 20 | 7 | 4.6 | 70 | 31 |

TABLE 2-continued

| Data | First electrochromic layer: Electro chromic agent | First electrochromic layer: Thickness (nm) | Second electrochromic layer: Electro chromic derivative | Second electrochromic layer: Thickness (nm) | Substrate haze: Before coating | Substrate haze: After coating | ECD: Transmittance | ECD: Light shielding rate |
|---|---|---|---|---|---|---|---|---|
| Ex.6 | Poly (o-amino phenol) | 500 | $TiO_2$ | 20 | 7 | 3.7 | 74 | 27 |
| Ex.7 | Poly (o-amino phenol) | 1000 | $TiO_2$ | 20 | 7 | 3.0 | 76 | 23 |
| Ex.8 | Poly (o-amino phenol) | 5000 | $TiO_2$ | 20 | 7 | 3.3 | 71 | 26 |
| C.Ex.1 | — | — | $TiO_2$ | 20 | 7 | 6.5 | 69 | 48 |
| C.Ex.2 | pernigraniline | 0.1 | $TiO_2$ | 20 | 7 | 6.4 | 69 | 48 |
| C.Ex.3 | pernigraniline | 5500 | $TiO_2$ | 20 | 7 | 6.6 | 70 | 47 |
| C.Ex.4 | Poly (o-amino phenol) | 0.1 | $TiO_2$ | 20 | 7 | 6.6 | 69 | 47 |
| C.Ex.5 | Poly (o-amino phenol) | 5500 | $TiO_2$ | 20 | 7 | 6.7 | 71 | 48 |

As shown in Table 2, the reduction of the haze value and the light-shielding rate of the substrate of Examples 1 to 8 were lower and the transmittance of Examples 1 to 8 was higher than those of Comparative Examples 1 to 5.

<2. Electrochromic Device Comprising First Electrochromic Layer (33) Including First Electrochromic Derivative (210) and Second Electrochromic Layer (35) Including Second Electrochromic Derivative (220)>

Electrochromic Device Formation Method: Sample 1 (Examples 9-16 and Comparative Examples 6-9)

Step 1: Manufacture of first electrode layer (reduction discoloration layer)

(1) Formation of conductive coating

The conductive coating was formed by coating fluorine-doped tin oxide (FTO) on a substrate.

(2) Formation of first electrochromic layer (33)

In Examples 9 to 16, a solution containing $TiO_2$ having particle sizes of 7 nm or 13 nm was bar-coated on the FTO to a thickness in the range of 100 nm to 5000 nm and dried at 80° C. to form a first electrochromic layer 33.

In Comparative Examples 6 to 9, a solution containing $TiO_2$ having particle sizes of 7 nm or 13 nm was bar-coated on the FTO to a thickness of less than 100 nm and greater than 5000 nm and dried at 80° C. to form a first electrochromic layer 33.

(3) Formation of second electrochromic layer (35)

Thereafter, a solution containing $TiO_2$ having a particle size of 20 nm was coated to a thickness of 2000 nm to form a second electrochromic layer 35.

(4) Bonding of first electrochromic layer (33) and second electrochromic layer (35) with electrochromic agent Thereafter, viologen was adsorbed to a thickness 2000 nm.

Step 2: Manufacture of second electrode layer (oxidative discoloration layer)

A conductive coating was formed by coating FTO on the substrate.

In each of Examples 9 to 16 and Comparative Examples 6 to 9, a solution containing $TiO_2$ having a particle size of 20 nm was bar-coated on the FTO to a thickness of 3000 nm and dried at 80° C.

Thereafter, triphenylamine (TPA) was adsorbed.

Step 3: Bonding and curing of the first electrode layer and the second electrode layer The first electrode layer and the second electrode layer were bonded together using a sealing agent.

Thereafter, an electrolyte was injected between the first electrode layer and the second electrode layer, followed by curing at 1 $J/cm^2$.

Electrochromic Device Formation Method: Sample 2 (Examples 17-20 and Comparative Examples 10-13)

Step 1: Manufacture of first electrode layer (reduction discoloration layer)

(1) Formation of conductive coating

The conductive coating was formed by coating FTO on the substrate.

(2) Formation of first electrochromic layer (33)

In Examples 17 to 20, a solution containing $WO_3$ having particle sizes of 7 nm or 13 nm was bar-coated on the FTO to a thickness in the range of 100 nm to 5000 nm and dried at 80° C. to form a first electrochromic layer 33.

In Comparative Examples 10 to 12, a solution containing $WO_3$ having particle sizes of 20 nm was bar-coated on the FTO to a thickness in ranges of 1 nm, 10 nm and 5500 nm and dried at 80° C. to form a first electrochromic layer 33.

(3) Formation of second electrochromic layer (35)

In each of Examples 17 to 20 and Comparative Examples 10 to 12, a solution containing $WO_3$ having a particle size of 20 nm was bar-coated on the FTO to a thickness of 2000 nm and dried at 80° C. to form a second electrochromic layer 35.

Step 2: Manufacture of second electrode layer (oxidative discoloration layer)

A conductive coating was formed by coating FTO on the substrate.

Thereafter, a NiO solution was bar-coated on the FTO to a thickness of 1 nm.

Step 3: Fabrication of experimental cell

A solid electrolyte was slit-coated on the first electrode layer formed in step 1 and then cured.

An experimental cell was fabricated by covering the second electrode layer.

Table 3 below shows examples of the present invention and comparative examples. That is, when the first electrochromic layer 33 is made of the first electrochromic agent 310 and the first electrochromic derivative 210 (including particles), the relationship with respect to the particle sizes of the second electrochromic layer 35, and differences in the haze reduction depending on the thickness of the first electrochromic layer 33, and the transmittance and light-shielding rate of each electrochromic device (ECD), are comparatively shown.

TABLE 3

| | First electrochromic layer | | | | Second electrochromic layer | | | | | ECD | |
|---|---|---|---|---|---|---|---|---|---|---|---|
| | | | | | | | | Substrate haze | | | |
| Data | Electrochromic agent | Electrochromic derivative | Particle size (nm) | Thickness (nm) | Electrochromic agent | Electrochromic derivative | Particle size (nm) | Before coating | After coating | Transmittance | Light-shielding rate |
| Ex.9 | Viologen | $TiO_2$ | 7 | 100 | viologen | $TiO_2$ | 20 | 7 | 3.5 | 70 | 10 |
| Ex.10 | Viologen | $TiO_2$ | 7 | 1000 | viologen | $TiO_2$ | 20 | 7 | 2.9 | 75 | 8 |
| Ex.11 | Viologen | $TiO_2$ | 7 | 3000 | viologen | $TiO_2$ | 20 | 7 | 1.8 | 73 | 8 |
| Ex.12 | Viologen | $TiO_2$ | 7 | 5000 | viologen | $TiO_2$ | 20 | 7 | 2.1 | 71 | 7 |
| Ex.13 | Viologen | $TiO_2$ | 13 | 100 | viologen | $TiO_2$ | 20 | 7 | 3.9 | 72 | 12 |
| Ex.14 | viologen | $TiO_2$ | 13 | 500 | viologen | $TiO_2$ | 20 | 7 | 3.3 | 74 | 11 |
| Ex.15 | viologen | $TiO_2$ | 13 | 1000 | viologen | $TiO_2$ | 20 | 7 | 3.1 | 76 | 9 |
| Ex.16 | viologen | $TiO_2$ | 13 | 5000 | viologen | $TiO_2$ | 20 | 7 | 3.4 | 74 | 10 |
| Ex.17 | — | $WO_3$ | 20 | 100 | — | $WO_3$ | 100 | 7 | 4.1 | 73 | 15 |
| Ex.18 | — | $WO_3$ | 20 | 500 | — | $WO_3$ | 100 | 7 | 3.8 | 74 | 14 |
| Ex.19 | — | $WO_3$ | 20 | 1000 | — | $WO_3$ | 100 | 7 | 3.3 | 75 | 13 |
| Ex.20 | — | $WO_3$ | 20 | 5000 | — | $WO_3$ | 100 | 7 | 3.6 | 74 | 14 |
| C.Ex.6 | viologen | $TiO_2$ | 7 | 10 | viologen | $TiO_2$ | 20 | 7 | 6.3 | 68 | 18 |
| C.Ex.7 | viologen | $TiO_2$ | 7 | 5500 | viologen | $TiO_2$ | 20 | 7 | 6.4 | 67 | 17 |
| C.Ex.8 | viologen | $TiO_2$ | 13 | 10 | viologen | $TiO_2$ | 20 | 7 | 6.5 | 66 | 19 |
| C.Ex.9 | viologen | $TiO_2$ | 13 | 5500 | viologen | $TiO_2$ | 20 | 7 | 6.9 | 62 | 17 |
| C.Ex.10 | — | $WO_3$ | 20 | 1 | viologen | $TiO_2$ | 20 | 7 | 6.6 | 69 | 18 |
| C.Ex.11 | — | $WO_3$ | 20 | 10 | — | $WO_3$ | 100 | 7 | 6.1 | 68 | 21 |
| C.Ex.12 | — | $WO_3$ | 20 | 5500 | — | $WO_3$ | 100 | 7 | 5.9 | 69 | 20 |
| C.Ex.13 | — | — | — | — | — | $WO_3$ | 100 | 7 | 6.2 | 67 | 23 |

As shown in Table 3, the reduction of the haze value of Examples 9 to 20 and the light-shielding rate of the substrate of Examples 9 to 20 were lower and the transmittance of Examples 9 to 20 was higher than those of Comparative Examples 6 to 13.

<Method for Manufacturing Electrochromic Device>

Figure 5:
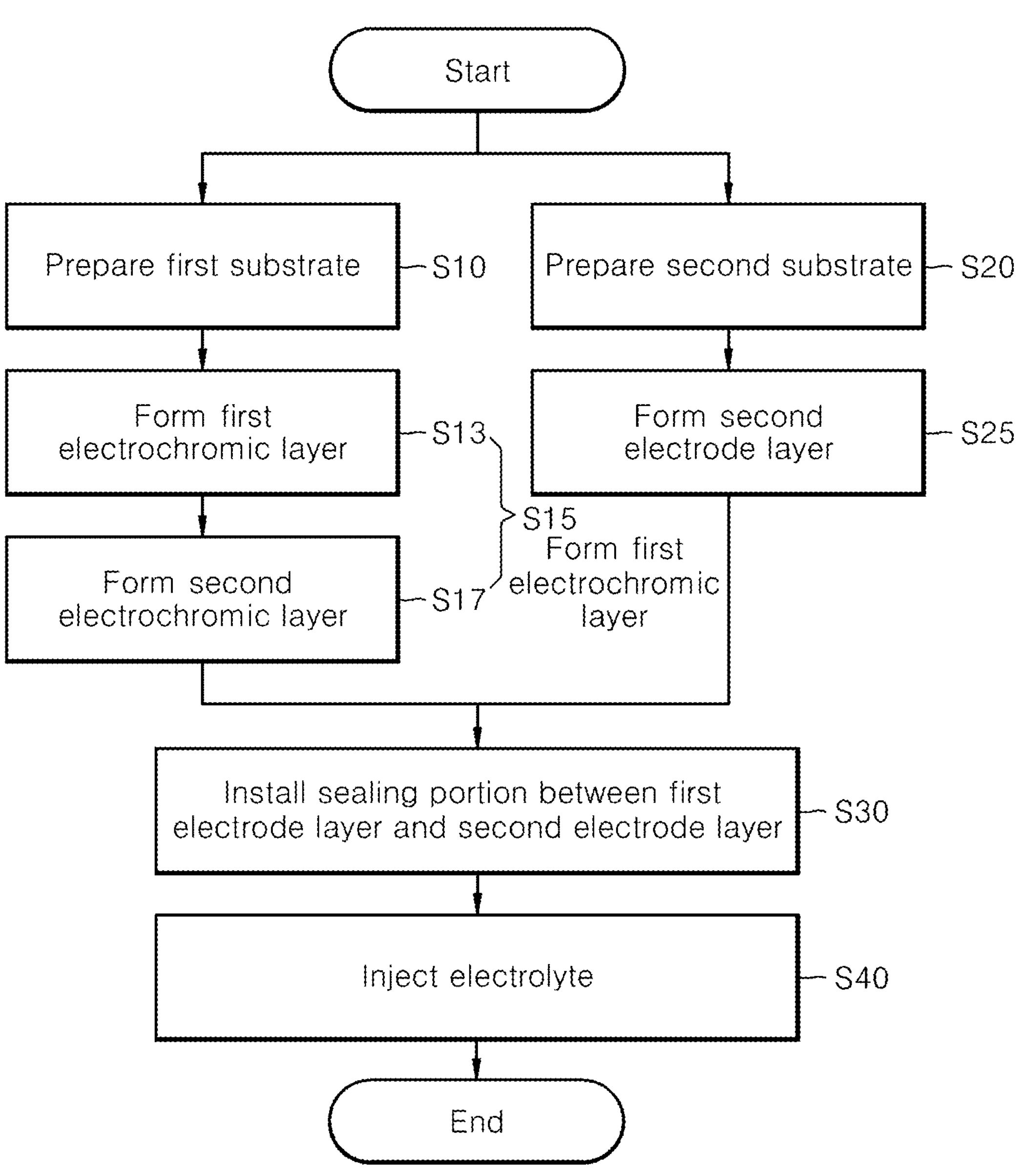
FIG. 5 is a flow chart showing a method for manufacturing an electrochromic device according to an embodiment of the present invention.

FIG. 5 is a flow chart showing a method for manufacturing an electrochromic device according to an embodiment of the present invention.

Referring to FIG. 5, first, a first substrate 10 and a second substrate 100 are prepared, respectively (S10, S20). Next, a first electrode layer 30 formed on the first substrate 10 and a second electrode layer 130 formed on the second substrate 100 are disposed to be spaced apart from each other and assembled into a sealing portion 175 to form a sealed empty space (S30). Then, an electrolyte 50 is injected into the empty space, thereby manufacturing an electrochromic device (S40).

Next, the preparing of the first substrate 10 (S10) includes forming a first electrode layer 30 on the first substrate 10 (S15). Here, the forming of the first electrode layer 30 (S15) may include forming a first conductive coating 20 on the first substrate 10, forming a first electrochromic layer 33 on the first conductive coating 20 (S13), and forming a second electrochromic layer 35 (S17).

Next, in the forming of the first electrochromic layer 33 and the second electrochromic layer 35 (S13 and S17), a first electrochromic layer 33 may be formed on the first substrate 10 coated with the first conductive coating 20, and a second electrochromic layer 35 may be formed on the first electrochromic layer 33.

Then, the preparing of the second substrate 100 (S20) may include forming a second electrode layer 130 on the second substrate 100 (S25). The second electrode layer 130 may be formed by forming a second conductive coating 120 on the second substrate 100 and coating or adsorbing an electrode layer forming material on the second conductive coating 120.

Although the present invention has been described in detail through the embodiments and the accompanying drawings, it is obvious to a person skilled in the art that various substitutions, modifications and changes can be made within the scope of the technical spirit of the present invention. Accordingly, the scope of protection of the present invention should be determined by the appended claims.

The invention claimed is:

1. An electrochromic device comprising:

a first electrochromic layer made of a first electrochromic derivative or a combination of a first electrochromic derivative and a first electrochromic agent; and a second electrochromic layer located on at least one surface of the first electrochromic layer and made of a second electrochromic derivative or a combination of a second electrochromic derivative and a second electrochromic agent, wherein the first electrochromic layer and the second electrochromic layer are in direct contact, wherein the diameter of the first electrochromic derivative and the diameter of the second electrochromic derivative satisfy the conditional expression 1 below:

$S_1 < S_2$ <Conditional Expression 1> where $S_1$ is the diameter of the first electrochromic derivative, and $S_2$ is the diameter of the second electrochromic derivative, and wherein the diameter of the first electrochromic derivative further satisfies the conditional expression 2 below:

$1\ nm < S_1 < 500\ nm.$ <Conditional Expression 2>

2. The electrochromic device of claim 1, wherein each of the first and second electrochromic agents comprises at least one of an organic material or an organic-inorganic composite.

3. The electrochromic device of claim 2, wherein the organic material comprises at least one selected from the group consisting of pyrrole, furan, thiophene, phenazine, selenophene, aniline, EDOT, EDOS, ProDOT, polyaniline, polypyrrole, polythiophene, carbazole, poly(p-phenylene vinylene), polyphenylene vinylene (PPV), poly(o-aminophenol), acetylene, phenylenediamine, phenothiazine, tetrathiafulvalene (TTF), viologen, wurster blue, perylene diimide, and triethylamine.

4. The electrochromic device of claim 2, wherein the organic-inorganic composite comprises at least one selected from the group consisting of porphyrin, prussian blue, phthalocyanine, and bismuth.

5. The electrochromic device of claim 1, wherein each of the first and second electrochromic derivatives comprises an inorganic material.

6. The electrochromic device of claim 5, wherein the inorganic material comprises at least one material selected from the group consisting of titanium (Ti), chromium (Cr), iron (Fe), cobalt (Co), tantalum (Ta), indium (In), magnesium (Mg), copper (Cu), zinc (Zn), tin (Sn), iridium (Ir), molybdenum (Mo), nickel (Ni), tungsten (W), vanadium (V), cerium (Ce), cesium (Cs), platinum (Pt), manganese (Mn), niobium (Nb), rhodium (Rh), ruthenium (Ru), antimony (Sb), and an oxide thereof.

7. The electrochromic device of claim 1, wherein the first electrochromic layer satisfies the conditional expression 3 below:

$$1\ nm \leq L_t \leq 5000\ nm$$ <Conditional Expression 3> where $L_t$ is the thickness of the first electrochromic layer.

* * * * *